Patented Nov. 4, 1952

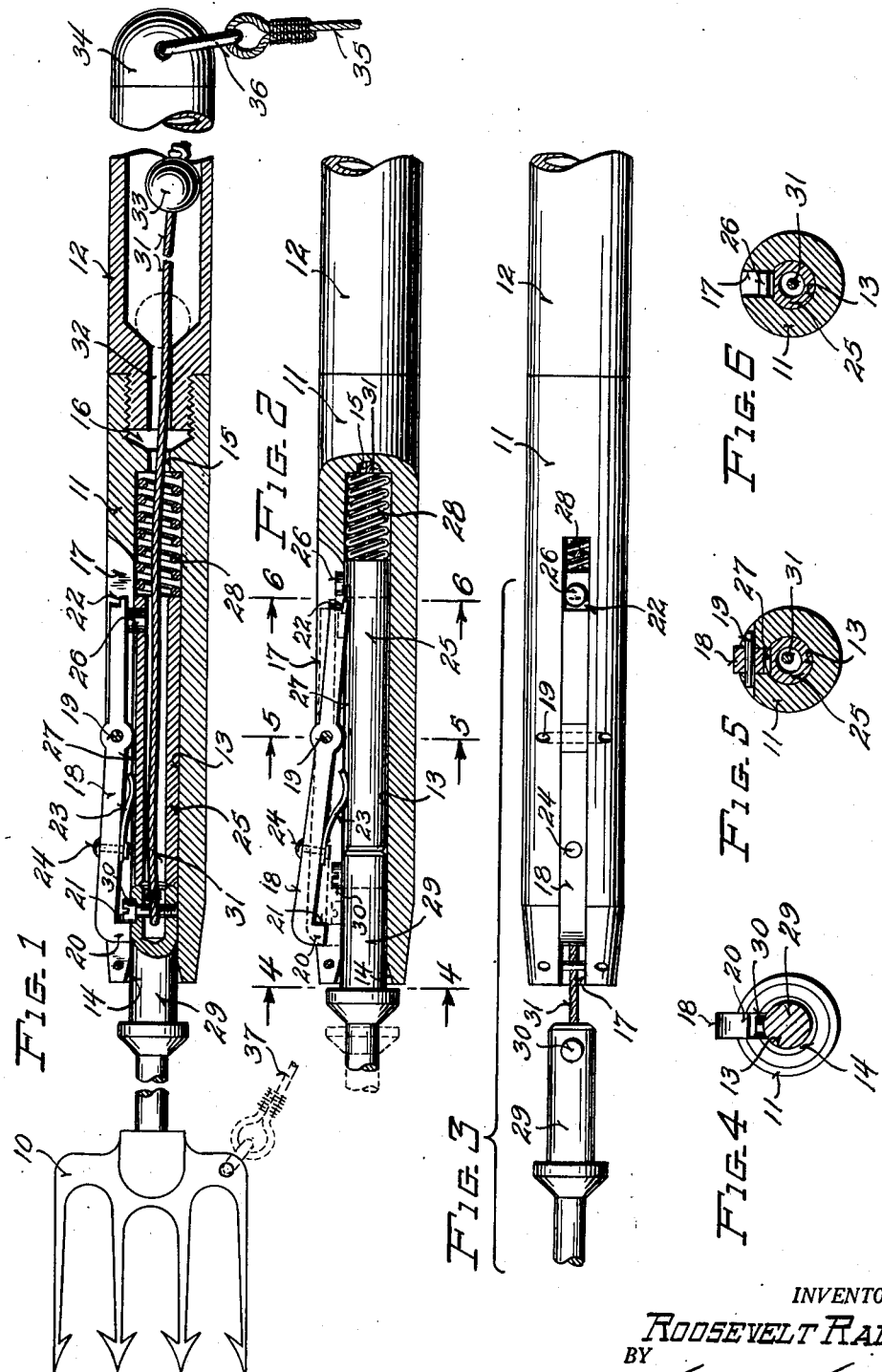

2,616,201

UNITED STATES PATENT OFFICE 2,616,201

FISH SPEAR

Roosevelt Radiker, West Allis, Wis.

Application February 24, 1950, Serial No. 146,117

6 Claims. (Cl. 43—6)

1

This invention relates to fish spears and more particularly to that type of spear in which the spear head is adapted to be released automatically from the body or shaft of the spear by the force of impact of the spear head entering the body of a fish.

The primary object of the present invention resides in the provision of a new and improved fish spear embodying means operative to effect the automatic release of the spear head from the body of the spear under the force of impact of the spear head entering the body of a fish.

Another object of the invention resides in the provision in a fish spear of a new and improved latch mechanism which normally functions to releasably retain the detachable head on the body of the spear but which is operable under the force of impact of the spear head with the body of a fish to effect the automatic release of the head from the body of the spear.

Another object of the invention resides in the provision in a fish spear of a new and improved latch mechanism, for releasably retaining the spear head on the body of the spear, which is not subject to manual or accidental manipulation to effect the unintentional release of the spear head from the body of the spear.

Another object of the invention resides in the provision in a fish spear of spring urged means operable upon release of the latch mechanism to forcibly eject the spear head from the body of the spear.

Another object of the invention resides in the provision in a fish spear of yieldable means operative to releasably retain the latch means selectively in head latching or in head releasing position.

A further object of the invention lies in the provision in a fish spear of a flexible connecting means which serves to retain the detachable head in remote association with the body of the spear when the head has been released and forcibly ejected from the body portion under the influence of the impact force of the spear head with a fish.

Other objects and advantages of the present invention will become manifest from the following description of an illustrative embodiment of the invention shown in the accompanying drawing.

In the drawing:

Figure 1 is a longitudinal sectional view of a fish spear constructed in accordance with the teachings of the present invention and showing the latch mechanism in position to releasably retain the spear head in fixed position on the end of the spear;

Fig. 2 is a fragmentary sectional view similar to that shown in Fig. 1 except for the fact that the latch mechanism is shown in an instantaneous spear head releasing position;

Fig. 3 is a top plan view of a portion of the fish spear showing the spear head ejected from the body of the spear and also showing the latch mechanism in ejector latching position;

Fig. 4 is a vertical sectional view taken on the line 4—4 of Fig. 2 and showing the latch mechanism in spear head releasing position;

Fig. 5 is a vertical sectional view taken on the line 5—5 of Fig. 2 and showing the pivotal mounting of the latch mechanism; and Fig. 6 is a vertical sectional view taken on the line 6—6 of Fig. 2 and showing the latch engaging slot in the stop pin in the head ejecting plunger which serves to limit the forward movement of the plunger.

The fish spear chosen for illustrative purposes in the accompanying drawing is constructed in accordance with the teachings of the present invention and comprises generally a device wherein the spear head is arranged for automatic release from the body of the spear under the force of impact of the spear head with the body of a fish being speared.

Referring more particularly to Fig. 1 of the drawing, it will be noted that the fish spear comprises a spear head 10 arranged for releasable connection with a body portion 11 of the spear which also includes a handle or shaft 12 which may be of any desired length. Since the nature of the use of this device demands its frequent immersion in water, the various metal parts of the spear are preferably formed of rust-proof material to insure long life and proper action.

The body portion 11 of the spear includes an axial bore 13 having a flared mouth 14 at its open end. The blind end of the bore 13 is connected by means of a passage 15 to a threaded socket 16 at the other end of the body. The socket 16 serves as a means for anchoring the body 11 to the threaded end of the shaft 12. A longitudinally disposed slot 17 cut in the wall of the body 11 and extending from the flared mouth 14 to a point near the blind end of the bore 12 serves to receive and house a latch element 18.

The latch element 18 comprises a bar positioned in the slot and rockably mounted intermediate its ends upon a fulcrum pin 19 which extends across the slot 17 and is anchored in the wall of the body portion 11 of the spear. The forward end of the latch element 18 terminates in a downwardly directed foot 20 having a substantially vertically disposed abutment surface 21 while the rearward end of the latch element terminates in an extended tongue or abutment surface 22. The latch element 18 is completed by the anchoring of a spring finger 23 to the under surface of the forward portion of the latch bar 18 by means of a rivet 24. The function and operation of the latch element 18 will be hereinafter more specifically described in connection with the operation of the parts of the device which it controls.

The spear head ejector mechanism comprises a hollow cylindrical plunger 25 adapted for axial sliding movement in the bore 13 of the body portion 11. A locating pin 26 anchored in the wall of the plunger 25 cooperates with the slot 17 to prevent rotation of the plunger 25 in the bore 13. A flat bearing surface 27 formed on the plunger 25 in axial alignment with the locating pin 26 serves as a surface on which the free end of the spring finger 23 bears to normally urge the forward end of the element away from the bore 13. A coil spring 28 located in the bore 13 is positioned between the inner end of the plunger 25 and the blind end of the bore 13 so as to constantly exert pressure upon the plunger 25 to urge it toward the mouth of the bore 13.

The spear head 10 is secured in any approved manner to the forward portion of a stub shaft 29 the rear portion of which is adapted to be slidably received in the bore 13 of the body 11. The flared mouth 14 at the end of the bore 13 serves to facilitate the introduction of the stub shaft 29 into the bore 13 and a locating pin 30 which projects beyond the surface of the stub shaft 29 serves to properly position the head 10 so that the latch element 18 can engage the pin 30 to releasably retain the spear head 10 in associated relationship with the spear. This correct locating of the head with respect to the latching element 18 is accomplished by reason of the fact that the rear portion of the stub shaft 29 can only be introduced into the open end of the bore when the locating pin 30 is aligned with the slot 17.

A flexible connecting means, in the form of a woven or twisted strand cable 31, is provided in the event that it is desired to retain the detachable head 10 of the spear in remote association with the body portion 11 when the head has been forcibly ejected from the body under the force of impact of the spear head with the body of a fish being speared. The greater portion of flexible connecting cable 31 normally lies within the hollow shaft 12 of the spear with the forward part of the cable passing through a passage 32 formed in the threaded end of the shaft 12; thence through the passage 15 in the body 11, through the center of the coil spring 28 and then through the center of the hollow ejector plunger 25. The forward end of the cable 31 is secured to the stub shaft 29 in any suitable manner, such as to the shank of the locating pin 30 which in the present disclosure is in the form of a cap screw. A ball 33 attached to the other end of the cable 31 serves as a means to prevent the cable 31 from being pulled out of forward end of the shaft 12 by reason of its contact with the shoulder formed between the passage 32 and the larger diameter of the hollow shaft 12.

A cap 34, preferably solid, forms a closure for the open end of the shaft 12. The cap 34 may be threaded into the end of the shaft 12 so that it may be readily removed to facilitate the application of the ball 33 to the inner end of the cable 31.

A retrieving line 35 is secured to the spear in any suitable manner, such as through the medium of a ring 36 attached to the cap 34.

In the event that it is deemed advisable to construct the spear without including the flexible connecting cable 31, a retrieving line 37 may be secured to the head 10 of the spear to provide a means for bringing in the speared fish independently of the body and shaft of the spear.

A brief description of the assembly and operation of the device will serve to emphasize its simplicity and effectiveness. The first step in the assembly comprises the insertion of the coil spring 28 into the bore 13 of the body portion 11 of the spear; the ejector plunger 25 is then inserted into the bore 13, with the locating pin 26 sliding in the slot 17. After these parts are in place, the assembled latch element 18 is positioned in the slot 17 and the fulcrum pin 19 is passed through the latch bar and secured in the wall of the body portion 11. The positioning of the latch element 18 serves to prevent the ejector plunger 25 from removal from the bore 13. In the event that the flexible cable 31 is included in the structure, one end of the cable is secured to the locating pin 30 secured in the stub shaft 29 and the other end of the cable 31 is passed through the hollow plunger 25, the center of the coil spring 28, the passage 15 in the body portion 11, the passage 32 in the threaded end of the shaft 12. The anchor ball 33 is then secured to the end of the cable 31 and the cap 34 is secured to the open end of the shaft 12 after the ball 33 has been dropped into the hollow shaft 12.

With the spear assembled in the manner above described, the head 10 may be inserted into the flared mouth 14 of the bore 13 with the locating pin 30 sliding into the slot 17. As the head 10 is pushed into the body portion 11 of the spear, the end of the stub shaft 29 contacts the outer end of the ejector plunger 25 and pressure is applied against the coil spring 28 to compress it to effect partial loading of the spring to place the several elements of the device in the position shown in Fig. 2 of the drawing. When the parts are in this position, manual pressure may be applied to the forward end of the latch element 18 to rock the same inwardly to the position shown in dotted lines, wherein the end of the foot 20 contacts the surface of the stub shaft 29. The pressure of the coil spring 28 will then urge the plunger 25 and stub shaft 29 forwardly to a position in which the front side of the locating pin 30 will be in pressure contact with the abutment surface 21 of the foot 20 to effect the latching action on the detachable head 10 of the spear within the body portion 11. At the same time, the locating pin 26 moves forwardly to assume a position beneath the bottom surface of the rearward part of the latch bar 18 to prevent either manual or accidental movement of the latching element to move it from its latching position, thereby providing a safety feature which prevents the accidental ejecting of the head from the body of the spear.

In operation, when the spear head is driven into the body of a fish, the impact of the spear head is of sufficient strength to push the ejecting plunger 25 against the pressure of the coil spring 28 a distance which will move the locating pin 26 beyond the extremity of the tongue 22 at the rear end of the latch bar 18. As the locating pin 26 moves beyond the tongue, to the position indicated in full lines in Fig. 2, the spring finger 23 acts to rock the latch bar 18 in a clockwise direction and in so doing, the foot 20 of the latch bar 18 is raised far enough to permit the locating pin 30 to move freely past it under the ejecting action of the coil spring 28 to forcibly eject the head of the spear from the body portion 11. With the latch bar 18 rocked to the position just described, the tongue 22 on the rear end of the bar 18 lies in contact with the surface 27 on the top of the plunger 25 in a position wherein it forms a stop against which the forward edge of the locating pin 26 is moved by the action of the coil spring 28. It should be noted at this point that the pin 26 is provided with an undercut portion in the form of a slot arranged to receive the tongue 22 of the latch bar 18 and thus provides an anchoring means which prevents the latch bar from being accidentally moved to permit further forward movement of the spring urged ejecting plunger 25.

From the foregoing detailed description of the construction and operation of the device, it will readily be understood that a simple and effective device has been provided which will normally retain a detachable head on the body of the spear but which will effect the automatic release of the spear head from the body of the spear under the force of impact of the head of the spear with the body of a fish being speared.

While the invention has been described in considerable detail in the foregoing specification, it is to be understood that various changes may be made in its embodiment without departing from or sacrificing any of the advantages hereinafter claimed.

I claim:

1. A fish spear comprising a tubular body portion having a longitudinally disposed slot in its wall, a spear handle secured to one end of said body portion, a detachable spear head receivable in the other end of said body portion, a spring urged spear head ejector plunger mounted for sliding movement in said body portion, a latch engaging pin on said spring urged plunger arranged for sliding movement in said slot, a latch engaging pin on said detachable spear head arranged for sliding movement in said slot, and a latch element disposed within said slot, said latch element being rockably mounted and adapted for manual movement to engage the latch pin on said spear head to releasably retain said detachable head on said spear, said latch element also being responsive to movement of the spring urged plunger under the force of impact of the spear head with the body of a fish to effect the automatic release of the latching engagement between said latch and said latching pin on said detachable spear head permitting said detachable spear head to be forcibly ejected from the body of the spear under the action of said spring urged plunger.

2. A fish spear comprising a tubular body portion having a longitudinally disposed slot in its wall, a handle secured to one end of said body portion, a detachable spear head slidably receivable in the other end of said body portion, a spring urged spear head ejector plunger slidably mounted in said body portion, a latch element rockably mounted in said slot, a latching pin on said detachable spear head, said latch element being responsive to manual operation to engage said latch pin to releasably retain said detachable spear head in position on said spear, a locating pin on said spring urged plunger disposed for sliding movement in said slot, said locating pin being disposed beneath a portion of said latch element when said detachable spear head is in retained position on said spear to form a stop to prevent accidental movement of said latch element to release said latch element from spear head retaining position, said locating pin being movable with said spring urged plunger in response to the force of impact of said spear head with the body of a fish to effect the automatic release of said latch element from spear head retaining position and permit said detachable head to be forcibly ejected from said body portion under the influence of said spring urged plunger.

3. In a fish spear the combination with a body portion and a detachable spear head, of a rockably mounted latching element on said body portion, said rockably mounted latching element including a spear head engaging abutment and a locating pin engaging abutment, said latching element being responsive to manual operation to releasably retain said spear head on said body portion, a spring urged plunger within said body portion, said spring urged plunger being cocked when said spear head is retained on said spear, a locating pin on said plunger, said locating pin forming a stop to prevent accidental release of said latch element, said locating pin being movable with said plunger under the force of impact of said spear head with the body of a fish to effect the automatic release of said latch element whereby said detachable head is forcibly ejected from said body portion under the influence of said spring urged plunger.

4. A fish spear comprising a body portion, a longitudinally disposed bore in said body portion, a longitudinally disposed slot in the wall of said body portion opening into said bore, a spear handle secured to one end of said body portion, a detachable spear head slidably receivable in the other end of said body portion, a coil spring housed in said bore, a spear head ejector plunger slidably mounted in said bore and operatively associated with said coil spring, a latch element rockably mounted in said slot, a latching pin on said detachable spear head, arranged for engagement by said latch element to releasably retain said spear in said body portion, a locating pin on said plunger arranged to cooperate with a portion of said latch element to prevent accidental release of said latch element from spear head retaining position, said locating pin being movable with said plunger in response to the force of impact of said spear head with the body of a fish to effect the automatic release of said latch element from spear head retaining position and permit said detachable head to be forcibly ejected from said body portion under the influence of said spring urged spear head ejector plunger.

5. A fish spear comprising a body portion, a bore in said body portion, a coil spring in said bore, a spear head ejector or plunger slidably mounted in said bore operatively associated with said coil spring, a detachable spear head having a stub shaft slidably receivable into the open end of said bore, a laterally projecting piece on said stub shaft, a laterally projecting piece on said plunger, and a latch element rockably mounted on said body portion, an abutment surface formed at one end of said latch element engageable with said laterally projecting piece on said stub shaft to releasably retain said detachable spear head on said body portion, an abutment surface formed at the other end of said latch element engageable with said laterally projecting piece on said latch spring urged plunger to limit the movement of said plunger in said bore after said spear head has been forcibly ejected from said body portion under the action of said plunger.

6. In a fish spear the combination with a hollow tubular body portion, a hollow spear handle secured to one end of said body portion, and a separable spear head receivable in the other end of said body portion, of a hollow plunger slidably mounted in said body portion, a coil spring in abutting contact with said plunger urging the same toward said spear head, manually operable latching means movable to engage said spear head to releasably retain the same in said body portion, latch contacting means on said plunger disposed below said latching means to limit its movement to prevent accidental release of said latching means, said latch contacting means being movable in response to the force of impact of the spear head with a fish to effect the automatic release of said latching means and the forcible ejection of said spear head from said body, and a flexible cable having one end secured to said spear head and the other end retained within said hollow handle for retaining said free spear head in remote association with said body portion of said spear.

ROOSEVELT RADIKER.

REFERENCES CITED

The following references are of record in the file of this patent:

UNITED STATES PATENTS

| Number | Name | Date |
|---|---|---|
| 1,072,672 | Sweet | Sept. 9, 1913 |
| 1,324,829 | Kornis | Dec. 16, 1919 |
| 1,727,812 | David | Sept. 10, 1929 |
| 2,442,974 | Frederiksen | June 8, 1948 |